United States Patent
Bilgory et al.

(10) Patent No.: US 10,665,242 B2
(45) Date of Patent: May 26, 2020

(54) CREATING MODULAR CONVERSATIONS USING IMPLICIT ROUTING

(71) Applicant: International Business Machines Corporation, Armonk, NY (US)

(72) Inventors: Erez L M Bilgory, Kiryat Tiveon (IL); Eyal Cohen, Zichron Yaacov (IL); Daniel Rose, Modiin (IL); Segev E Wasserkrug, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/706,750

(22) Filed: Dec. 8, 2019

(65) Prior Publication Data

US 2020/0111492 A1    Apr. 9, 2020

Related U.S. Application Data

(63) Continuation of application No. 15/796,804, filed on Oct. 29, 2017, now Pat. No. 10,546,584.

(51) Int. Cl.
  *G06F 16/00*   (2019.01)
  *G10L 15/22*   (2006.01)
  (Continued)

(52) U.S. Cl.
  CPC .............. *G10L 15/22* (2013.01); *G06F 3/167* (2013.01); *G06F 16/685* (2019.01); *G06F 16/686* (2019.01); *G10L 15/02* (2013.01); *G10L 15/04* (2013.01); *G10L 15/1815* (2013.01); *G10L 2015/223* (2013.01)

(58) Field of Classification Search
  CPC ...................................................... G06F 16/00
  See application file for complete search history.

(56) References Cited

U.S. PATENT DOCUMENTS

2014/0101126 A1* 4/2014 Kasterstein ......... G06F 16/9535
  707/707
2015/0032714 A1* 1/2015 Simhon ................. G06F 16/951
  707/706

(Continued)

OTHER PUBLICATIONS

Watson Conversation Service (WCS), Available at: https://console.bluemix.net/docs/services/conversation/getting-started.html#gettingstarted.

(Continued)

*Primary Examiner* — Shreyans A Patel
(74) *Attorney, Agent, or Firm* — G. E. Ehrlich

(57) ABSTRACT

A computer implemented method of routing a verbal input to one of a plurality of handlers, comprising using one or more processors adapted to execute a code, the code is adapted for receiving a verbal input from a user, applying a plurality of verbal content identifiers to the verbal input, each of the verbal content identifiers is adapted to evaluate an association of the verbal input with a respective one of a plurality of handlers by computing a match confidence value for one or more features, such as an intent expressed by the user and/or an entity indicated by the user, extracted from the verbal input and routing the verbal input to a selected one of the handlers based on the matching confidence value computed by the plurality of verbal content identifiers. The selected handler is adapted to initiate one or more actions in response to the verbal input.

20 Claims, 2 Drawing Sheets

(51) Int. Cl.
  *G06F 16/683* (2019.01)
  *G06F 16/68* (2019.01)
  *G10L 15/04* (2013.01)
  *G10L 15/18* (2013.01)
  *G06F 3/16* (2006.01)
  *G10L 15/02* (2006.01)

(56) References Cited

U.S. PATENT DOCUMENTS

| | | | |
|---|---|---|---|
| 2017/0139879 A1* | 5/2017 | Sharifi | G06F 3/0482 |
| 2017/0300831 A1* | 10/2017 | Gelfenbeyn | G10L 15/1815 |
| 2018/0085928 A1* | 3/2018 | Yamato | B25J 9/0003 |
| 2018/0113606 A1* | 4/2018 | Crawford | G06F 3/0304 |
| 2018/0137401 A1* | 5/2018 | Kumar | G06F 17/2785 |
| 2019/0005953 A1* | 1/2019 | Bundalo | G10L 15/22 |
| 2019/0012198 A1* | 1/2019 | Ni | G06F 3/16 |

OTHER PUBLICATIONS

Watson Virtual Agent (WVA), Available at: https://www.ibm.com/us-en/marketplace/cognitive-customer-engagement/resources.
API.AI, Available at: https://dialogflow.com/docs/getting-started/basics.
Wit.ai, Available at: https://wit.ai/docs/quickstart.
Amazon Alexa, Available at: https://developer.amazon.com/docs/ask-overviews/build-skills-with-the-alexa-skills-kit.html.
Regexp, Available at: https://en.wikipedia.org/wiki/Regular_expression.
Watson Natural Language Understanding (NLU), Available at: https://www.ibm.com/watson/developercloud/natural-language-understanding/api/v1/#introduction.

* cited by examiner

CREATING MODULAR CONVERSATIONS USING IMPLICIT ROUTING

RELATED APPLICATION

This application is a Continuation of U.S. patent application Ser. No. 15/796,804 filed on Oct. 29, 2017, the contents of which are incorporated herein by reference in their entirety.

BACKGROUND

The present invention, in some embodiments thereof, relates to automatically routing verbal inputs received from users to verbal content handlers, and, more specifically, but not exclusively, to automatically routing verbal inputs to the verbal content handlers using implicit routing based on content and optionally context of the verbal inputs.

Recent times have witnessed rapid and major advancements in development, deployment and use of automated systems, platforms and/or services. Human-machine interaction (HMI) may be a key element in many such automated environment applications, for example, mobile applications (e.g. mobile devices), lifestyle applications (e.g. artificial and/or virtual personal assistants), commerce applications, transportation (e.g. autonomous vehicles) applications and/or the like.

Major advancements in computer technology, in hardware (e.g. increased computing resources) as well as in computer science and software (e.g. algorithmic processing, machine learning, etc.) have paved the way for transition from traditional HMI to more natural HMI. The traditional HMI implementation may require the user to use intermediate devices, tools and/or interfaces, for example, a keyboard, a pointing device (e.g. mouse, touchpad, etc.), a touchscreen and/or the like. The natural HMI, for example, voice, speech, gestures and/or the like on the other hand may relief the user of the need to use the intermediators and directly communicate with the machine, i.e. the computer, the mobile device, the autonomous vehicle and/or the like.

Among, the natural HMIs, speech and conversation may be of significant appeal as spoken language and conversational skills are acquired by most people at early age and may be the most common and efficient way of interaction among people. Therefore employing the conversational interaction for the HMI implementation may be highly desirable. Such speech and conversation HMI implementation may apply one or more of a plurality of tools, techniques and/or methods, for example, speech recognition, speech to text (STT) conversion, speech synthesis, natural language processing (NLP), conversation construction and/or the like.

SUMMARY

According to a first aspect of the present invention there is a computer implemented method of routing a verbal input to one of a plurality of handlers, comprising using one or more processors adapted to execute a code, the code is adapted for:
Receiving a verbal input from a user.
Applying a plurality of verbal content identifiers to the verbal input, each of the plurality of verbal content identifiers is adapted to evaluate an association of the verbal input with a respective one of a plurality of handlers by computing a match confidence value for one or more features extracted from the verbal input. The one or more features comprise one or more of: an intent expressed by the user and an entity indicated by the user.
Routing the verbal input to a selected one of the plurality of handlers based on the matching confidence value computed by the plurality of verbal content identifiers, the selected handler is adapted to initiate one or more actions in response to the verbal input.

Using the plurality of (verbal content) handlers and efficiently routing the verbal input(s) to these handlers may significantly reduce complexity of analyzing the verbal input(s) and hence the dialog flow with the user compared to analyzing the dialog flow in a single workspace. This reduced complexity may in turn increase accuracy of the estimation of the intent of the user, reduce and/or eliminate ambiguity embedded in the verbal input, reduce computation resources for analyzing the verbal input(s), reduce latency in responding to the received verbal input and/or the like. Moreover, implicitly routing the verbal input(s) to the preferred handler without requiring the user to explicitly state the intended handler may relieve the user from keeping track and remembering which handler is designated for which intent and/or action.

According to a second aspect of the present invention there is a system for routing a verbal input to one of a plurality of handlers, comprising one or more processors adapted to execute code, the code comprising:
Code instructions to receive a verbal input from a user.
Code instructions to apply a plurality of verbal content identifiers to the verbal input, each of the plurality of verbal content identifiers is adapted to evaluate an association of the verbal input with a respective one of a plurality of handlers by computing a match confidence value for one or more features extracted from the verbal input. The one or more features comprise one or more of: an intent expressed by the user and an entity indicated by the user.
Code instructions to route the verbal input to a selected one of the plurality of handlers based on the matching confidence value computed by the plurality of verbal content identifiers, the selected handler is adapted to initiate one or more actions in response to the verbal input.

According to a third aspect of the present invention there is a computer program product for routing a verbal input to one of a plurality of handlers, comprising:
A non-transitory computer readable storage medium;
First code instructions for receiving a verbal input from a user.
Second code instructions for applying a plurality of verbal content identifiers to the verbal input, each of the plurality of verbal content identifiers is adapted to evaluate an association of the verbal input with a respective one of a plurality of handlers by computing a match confidence value for one or more features extracted from the verbal input. The one or more features comprise one or more of: an intent expressed by the user and an entity indicated by the user.
Third code instructions for routing the verbal input to a selected one of the plurality of handlers based on the matching confidence value computed by the plurality of verbal content identifiers, the selected handler is adapted to initiate one or more actions in response to the verbal input.
Wherein the first, second and third program instructions are executed by one or more processors from the non-transitory computer readable storage medium.

In a further implementation form of the first, second and/or third aspects, the verbal input comprises one or more members of a group consisting of: textual verbal input and speech verbal input. This may allow applying the implicit routing to a plurality of applications directed to interact with the user through textual and/or speech interaction forms.

In an optional implementation form of the first, second and/or third aspects, the verbal input is segmented to a plurality of segments and routing each of the plurality of segments to one of the plurality of handlers according to the match confidence value computed by the plurality of verbal content identifiers for the each segment. Since a dialog session with the user may include complex verbal inputs possibly embedding multiple intended actions which may be managed by multiple handlers, segmenting the verbal input may significantly simplify analysis, evaluation of association to the handlers and hence the routing to the selected handler.

In a further implementation form of the first, second and/or third aspects, each of the plurality of verbal content identifiers is associated with a respective one of the plurality of handlers by adapting the each verbal content identifier to evaluate the association according to one or more predefined features defined for the respective handler. As each verbal content identifier is associated with a respective handler, each verbal content identifier may be specifically adapted, configured and/or trained according to the characteristics and/or features of its respective handler thus improving the accuracy of its evaluation association with the respective handler.

In a further implementation form of the first, second and/or third aspects, the match confidence value indicates a probability of the one or more features to match a respective predefined feature. The match confidence value computed by each verbal content identifier may thus serve as a metrics for measuring the association level of the extracted feature(s) with the respective handler.

In a further implementation form of the first, second and/or third aspects, the intent is extracted from the verbal input using one or more verbal analysis tools, the intent is a member of a group consisting of: an intention, a purpose, an objective and a goal. The intent(s) may be a key element in understanding and/or classifying the action(s) intended by the user and expressed in the verbal input. Therefore accurately extracting the intent(s) and associating it with one or more of the handlers may be essential.

In a further implementation form of the first, second and/or third aspects, the entity is extracted from the verbal input using one or more verbal analysis tools. The entity(s), for example, an object, an item, an element, a target device, a target application and/or the like may be a key element in understanding and/or classifying the action(s) intended by the user and expressed in the verbal input. Therefore accurately extracting the entity(s) and associating it with one or more of the handlers may be essential.

In an optional implementation form of the first, second and/or third aspects, the selected handler is selected based on one or more context attributes provided by one or more of the plurality of verbal content identifiers. The one or more context attributes comprise one or more of:
  An emotion of the user extracted using one or more voice analysis tools,
  A sentiment of the user extracted using one or more voice analysis tools,
  A geographical location of the user obtained from one or more location detection tools, and
  One or more previous features extracted from one or more previous verbal inputs.

Using the context attributes may significantly increase the accuracy of the selection of the selected handler since the context of the verbal input, the context of the user and/or the like may be highly indicative of the actual intent(s) of the user.

In an optional implementation form of the first, second and/or third aspects, the selected handler is selected based on detection of one or more mandatory entities extracted by one or more of the plurality of verbal content identifiers, the one or more mandatory entities are predefined to appear in the verbal input in conjunction with the intent. Basing the selection on mandatory predefined entity(s) may significantly increase the accuracy of the selection of the selected handler since in case of absence of entity(s) in the verbal input, one or more handlers which are predefined to mandatorily include such entity(s) may be ruled out as unappropriated for managing the verbal input.

In an optional implementation form of the first, second and/or third aspects, the selected handler is selected based on one or more operational attributes provided by one or more of the plurality of verbal content identifiers, The one or more operational attributes comprise one or more of:
  A threshold value,
  A capability of the respective handler to manage the verbal input,
  A description of an analysis applied by one or more of the plurality of verbal content identifiers to extract one or more of the features,
  A routing information relating to one or more previous verbal inputs, and
  Information obtained from at least another one of the plurality of handlers.

Using the operational attributes may significantly increase the accuracy of the selection of the selected handler since the operational context of the handlers may be highly indicative of the intent(s) of the user, in particular with respect to previous verbal input(s) and/or dialog flows of the dialog session with the user.

In an optional implementation form of the first, second and/or third aspects, the selected handler is selected according to a priority assigned to at least some of the plurality of verbal content identifiers. Prioritizing the verbal content identifiers in particular according to their associated handlers may allow elevating and/or decrease importance and/or criticality of the respective handlers over other handlers such that a certain handler may take precedence over another handler even when estimated to be less associated with the verbal input.

In an optional implementation form of the first, second and/or third aspects, one or more of the plurality of handlers are filtered out in case their associated verbal content identifiers present a confidence value which fails to exceed a predefined threshold. This may allow setting a minimal association level between a certain handler and the verbal input such that the handler may not be selected, i.e. filtered out in case its associated verbal content identifier computed a match confidence value lower than the predefined threshold.

In an optional implementation form of the first, second and/or third aspects, one or more of the plurality of handlers are filtered out in case they are indicated by one or more of their associated verbal content identifiers as incapable of managing the verbal input. This may allow avoiding selecting handlers which are currently unavailable and/or incapable of managing the verbal input thus reducing complexity and/or latency of the routing process.

In an optional implementation form of the first, second and/or third aspects, the verbal input is routed to a recent handler of the plurality of handlers in case a similar the confidence value is computed by multiple verbal content identifiers of the plurality of verbal content identifiers, the recent handler is a most recent handler to which a previous verbal input was routed among a group of handlers associated with the multiple verbal content identifiers. Previous (historical) dialog flows may significantly imply on the current routing of the verbal input and may therefore significantly improve accuracy in selecting the selected handler.

In an optional implementation form of the first, second and/or third aspects, the verbal input is routed to a default handler of the plurality of handlers in case the confidence value computed by the plurality of verbal content identifiers fails to exceed a predefined threshold. The In case no clear resolution can be made in selecting the selected handler, the verbal input may be routed to the default handler which may allow the user to better state, achieve and/or accomplish his intent(s).

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced In the drawings.

DETAILED DESCRIPTION

Figure 1:
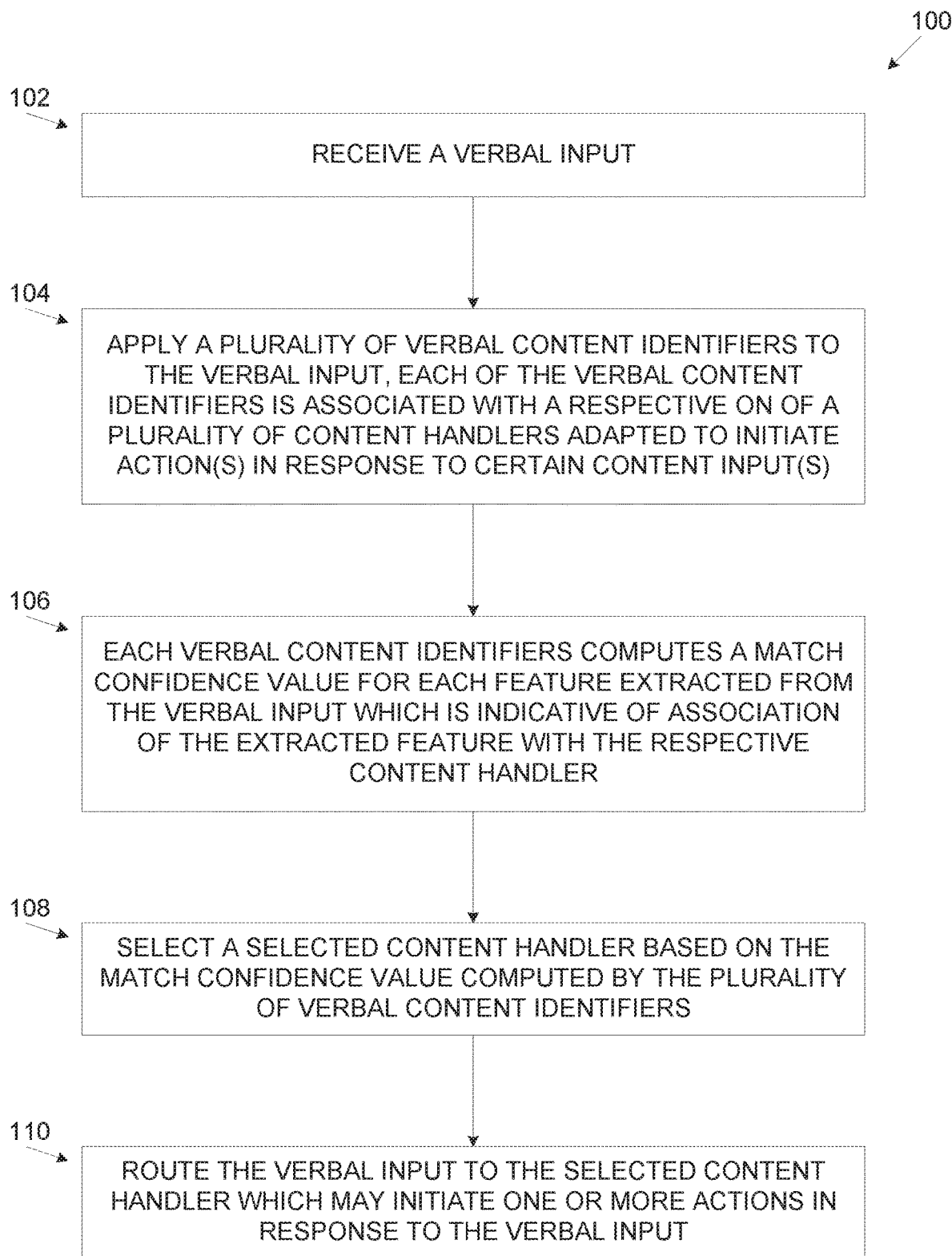
FIG. 1 is a flowchart of an exemplary process of automatically routing a verbal input to verbal content handlers using implicit routing based on content and optionally context of the verbal inputs, according to some embodiments of the present invention.

The present invention, in some embodiments thereof, relates to automatically routing verbal inputs received from users to verbal content handlers, and, more specifically, but not exclusively, to automatically routing verbal inputs to the verbal content handlers using implicit routing based on content and optionally context of the verbal inputs.

According to some embodiments of the present invention, there are provided methods, systems and computer program products for routing one or more verbal inputs, for example, a textual input, a speech input and/or the like received from one or more users to one or more verbal content handlers each adapted to manage (handle) one or more predefined verbal content features expressed by the user(s).

As automated services (e.g. artificial and/or virtual personal assistants, autonomous vehicles, mobile devices, bots, internet bots, etc.) constantly evolve, interaction between the automated systems and applications with human users and constructing dialog flows, specifically speech conversations becomes an essential key element. However, developing and/or supporting the interactive dialog flow for such systems and/or applications, in particular speech conversations may present a major challenge. It may require splitting, dividing and/or breaking possible verbal inputs, either textual inputs and/or speech inputs into a set of features, for example, content, an intent (intention, purpose, objective, goal, etc.) of the user, an entity (object, item, element, target device, target application, etc.) indicated by the user, a dialog flow of the current dialog session and/or the like.

Moreover, as the interactive dialog applications continuously enhance, providing additional functionality, the interactive dialog flow may become significantly more elaborate presenting further challenges in managing and handling the dialog in order to respond accurately to the verbal inputs captured from the user. In particular, processing the verbal input in a single workspace may prove inefficient, inadequate and possible impractical due to the complexity of the dialog. In order to overcome this limitation, a plurality of verbal content handlers may be designed, adapted and deployed to manage accurately different verbal inputs received from the user. Each of the verbal content handlers may be a processing module, for example, a software agent, an application and/or the like adapted to initiate one or more actions in response to certain predefined verbal inputs and/or part thereof received from the user. The actions initiated by the verbal content handlers may include one or more of a plurality of functions, features and/or operations indicated by the user and supported by the automated service, system and/or application. As each verbal input may be routed to its designated verbal content handler, managing the interactive dialog, in particular the speech conversation may be significantly improved and made more efficient.

According to some embodiments of the present invention, routing the verbal inputs to their designated verbal content handler is done implicitly by estimating and/or predicting the intent (intention, goal and/or objective) of the user as expressed in the received verbal input(s). This may be done by analyzing one or more verbal inputs to extract one or more features from the verbal input(s) received from a user and evaluate the intent of the user and routing the verbal input(s) to preferred verbal content handler(s) estimated to best serve the intent of the user. A correspondence (match) of the extracted features is evaluated with respect to feature(s) predefined for each of the verbal content handlers, thus an association of the verbal input to each of the verbal content handler(s) is evaluated. This may significantly reduce and possible eliminate ambiguity(s) in determining feature(s) embodied in the verbal input(s) and efficiently select automatically an appropriate (preferred) verbal content handler(s) which is estimated to best serve the estimated intent.

The analysis of the verbal input(s) and extraction of the feature(s) may be done by a plurality of verbal content identifiers each associated with a respective one of the verbal content handlers. Each of the verbal content identifiers may be specifically adapted, i.e. designed, configured, trained and/or the like to identify, in the verbal input(s), one or more predefined features associated with the respective verbal content handler. Each of the verbal content identifiers may apply one or more verbal analysis tools, for example, a textual analysis, speech recognition, a Natural Language Processing (NLP), a voice analysis and/or the like to extract the features. For each extracted feature, the verbal content identifiers may compute a match confidence value which indicates of a probability that the extracted feature matches a respective predefined feature associated with the respective verbal content handler.

The extracted features coupled with their computed match confidence value received from the plurality of verbal content identifiers may be evaluated to select a preferred verbal content handler that is estimated to best manage (handle, serve, etc.) the received verbal input, i.e. the verbal input is estimated to best associate with the selected verbal content handler. The verbal input is then routed to the selected verbal content handler which may take one or more actions in response to the received verbal input. The actions initiated by the verbal content handlers may include one or more of a plurality of functions, features and/or operations supported by the automated service, system and/or application interacting with the user.

Optionally, the verbal input is segmented to a plurality of segments each analyzed separately and provided to the verbal content identifiers which may extract the feature(s) and compute their match confidence value. A preferred verbal content handler may then be selected from the plurality of verbal content handlers for each of the segments.

Optionally, the routing is based on one or more context attributes and/or operational attributes provided by one or more of the verbal content identifiers and/or globally stored or maintained. One or more of the verbal content identifiers may extract one or more context attributes relating to the verbal input (e.g. feature(s) extracted from previous verbal inputs), the user (e.g. emotion, sentiment, geographical location, etc.) and/or the like. One or more of the verbal content identifiers may also report of one or more operational attributes relating to, for example, their respective verbal content handler, previous routing events of their respective verbal content handler, operational attributes of one or more other verbal content handlers and/or the like. One or more of the context attributes and/or the operational attributes may be used for selecting the preferred verbal content handler.

Implicitly routing the verbal input(s) to the preferred verbal content handler may present significant advantages compared to currently existing methods for managing interactive dialog flows.

First, using the plurality of verbal content handlers and efficiently routing the verbal input(s) to these verbal content handlers may significantly reduce complexity of analyzing the verbal input(s) and hence the dialog flow compared to analyzing the dialog flow in a single workspace as may be done by some of the existing methods, for example, Watson Conversation Service (WCS), API.AI, wit.ai. and/or the like. The reduced complexity may translate to several improvements in managing the verbal inputs and/or the dialog flow, for example, a more accurate estimation of the intent of the user (reduce and/or eliminate features ambiguity features ambiguity in the verbal input), reduced computation resources for analyzing the verbal input(s), reduced latency in responding to the received verbal input and/or the like.

Moreover, implicitly routing the verbal input(s) to the preferred verbal content handler may relieve the user from explicitly stating the verbal content handler that should be used for managing the current verbal input as may be done by some of the existing methods, for example, Alexa personal assistant by amazon and/or the like. As complexity of the automated interactive dialogs increases the number of verbal content handlers may be extremely large forcing the user to keep track and remember which verbal content handler is designated for which intent and/or action in order to properly address (state) the selected verbal content handler. The Alexa virtual personal assistant in which the verbal content handlers are referred to as skills, the number of skills rapidly increases and the user may need to uniquely associate and state each of his intentions and/or actions with a respective one of the skills. Therefore relieving the user from explicitly stating the verbal content handler to be used may present a major advantage.

Furthermore, implicitly routing the verbal input(s) to the preferred verbal content handler using the context attributes and/or the operational attributes may significantly reduce and/or eliminate features ambiguity in the verbal input thus increasing the accuracy in selecting the preferred verbal content handler. This is due to the fact that the contextual aspects relating to the verbal input(s) as well as contextual aspects relating to the user may be highly indicative of the intent of the user and may therefore be used to improve the estimation of the intent expressed by the user in the received verbal input(s). In addition, the operational attributes of the verbal content handlers may be highly useful to identify previous routing and/or management events of previous verbal input(s), specifically during the current dialog session thus allowing more accurate selection of the preferred verbal content handler to manage the current verbal input.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of automatically routing a verbal input to verbal content handlers using implicit routing based on content and optionally context of the verbal inputs, according to some embodiments of the present invention. A process 100 may be executed to route one or more verbal inputs, for example, a textual input, a speech input and/or the like received from one or more users to one or more verbal content handlers each adapted to manage (handle) one or more predefined verbal content features expressed by the user(s). The routing is based on analyzing the verbal input and extracting one or more features, for example, content, intent (intention, purpose, objective, goal, etc.), entity (object, item, element, target device, target application, etc.), dialog flows and/or the like identified in the verbal input. The analysis and extraction may be done by a plurality of verbal content identifiers each associated with a respective one of the verbal content handlers and adapted to identify in the verbal input one or more of the predefined features associated with the respective verbal content handler. Each of the verbal content identifiers may apply one or more verbal analysis tools, for example, a textual analysis, speech recognition, a Natural Language Processing (NLP), a voice analysis and/or the like to extract the features. For each extracted feature, the verbal content identifiers may compute a match confidence value indicative of a probability that the extracted feature matches a respective predefined feature associated with the respective verbal content handler.

The extracted features coupled with their computed match confidence value received from the plurality of verbal content identifiers are evaluated to select a preferred verbal content handler that is estimated to best manage the received verbal input, i.e. the verbal input is estimated to best associate with the selected verbal content handler. The verbal input is then routed to the selected verbal content handler which may take one or more actions in response to the verbal input.

Optionally, the verbal input is segmented to a plurality of segments each analyzed separately to extract the features and compute their match confidence value. A preferred verbal content handler may then be selected from the plurality of verbal content handlers for each of the segments.

Optionally, the routing is based on one or more context attributes and/or operational attributes provided by one or more of the verbal content identifiers. One or more of the verbal content identifiers may extract one or more context attributes relating to the verbal input (e.g. feature(s) extracted from previous verbal inputs), the user (e.g. emotion, sentiment, geographical location, etc.) and/or the like. One or more of the verbal content identifiers may also report of one or more operational attributes relating to, for example, their respective verbal content handler, previous routing events, one or more other verbal content handlers and/or the like. One or more of the context attributes and/or the operational attributes may be used for selecting the preferred verbal content handler.

Figure 2:
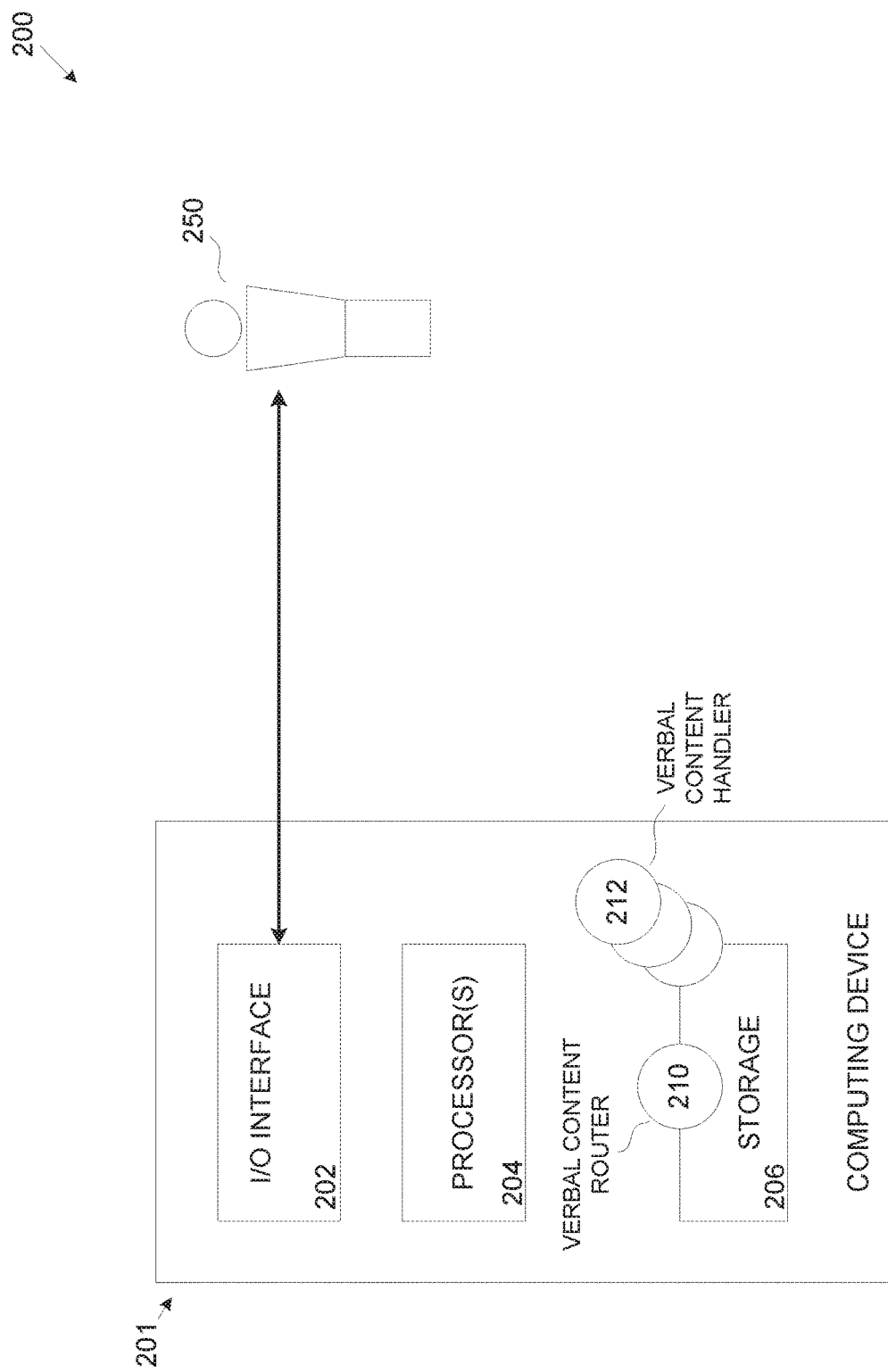
FIG. 2 is a schematic illustration of an exemplary system for automatically routing a verbal input to verbal content handlers using implicit routing based on content and optionally context of the verbal inputs, according to some embodiments of the present invention.

Reference is also made to FIG. 2, which is a schematic illustration of an exemplary system for automatically routing a verbal input to verbal content handlers using implicit routing based on content and optionally context of the verbal inputs, according to some embodiments of the present invention. An exemplary system 200 for classifying verbal inputs from one or more users 250 includes a computing device 201, for example, a processing node, a computer, a laptop, a server, a mobile device (e.g. a tablet, a cellular device, a Smartphone, etc.), a home appliance integrating a processing device, a processing device of an autonomous vehicle and/or any processing device having one or more processor. The computing device 201 comprises an Input/Output (I/O) interface 202, a processor(s) 204 and storage 206.

The I/O interface 202 may include one or more interfaces for interacting with the user(s) 250, in particular interface(s) for capturing verbal inputs from the user(s) 250. The verbal input may include, for example, a textual input, a speech input and/or the like. Accordingly the I/O interface 202 may include one or more audio interfaces, for example, a microphone to capture speech spoken (uttered) by the user(s) 250. The I/O interface 202 may also include one or more textual interfaces, for example, a keyboard, a touchscreen, a digital pen and/or the like to capture text inserted by the user(s) 250. The I/O interface 202 may further include one or more wired and/or wireless network interfaces for connecting to one or more networks, for example, a Local area Network (LAN), a Wide area Network (WAN), a Metropolitan Area Network (MAN), a cellular network, and/or the internet to facilitate communication with more or more remote locations and/or resources.

The processor(s) 204, homogenous or heterogeneous, may include one or more processors arranged for parallel processing, as clusters and/or as one or more multi core processor(s). The storage 206 may include one or more non-transitory persistent storage devices, for example, a hard drive, a Flash array and/or the like. The storage 206 may further comprise one or more network storage devices, for example, a storage server, a network accessible storage (NAS), a network drive, and/or the like. The storage 206 may also include one or more volatile devices, for example, a Random Access Memory (RAM) component and/or the like.

The storage 206 may store one or more software modules, for example, an OS, an application, a tool, an agent, a service, a script and/or the like each comprising a plurality of program instructions that may be executed by the processor(s) 204 from the storage 206. For example, the processor(s) 204 may execute a verbal content router 210 software module for routing verbal inputs captured from the user(s) 250 to one or more verbal content handlers 212 software modules adapted to initiate one or more actions in response to the verbal inputs. The actions initiated by the verbal content handlers 212 may include one or more of a plurality of functions, features and/or operations supported by the computing device 201. Each of the verbal content handlers 212 may be adapted to manage (handle) one or more verbal inputs and initiate one or more actions in response to detection of one or more predefined verbal inputs associated with the respective verbal content handler 212. The predefined verbal inputs may be identified and/or characterized by one or more features which may be extracted from the received verbal input, for example, content, intent (intention, purpose, objective, goal, etc.), entity (object, item, element, target device, target application, etc.), dialog flows and/or the like.

Optionally, the verbal content router 210 and/or one or more of the verbal content handlers 212 are executed by one or more remote platforms, for example, a remote server, a cloud computing platform, such as, for example, Amazon Web Service (AWS), Google Cloud, Microsoft Azure and/or the like. Additionally, and/or alternatively, the verbal content router 210 and/or one or more of the verbal content handlers 212 may be implemented as one or more remote services, a remote service, a cloud service, Software as a Service (SaaS), a Platform as a Service (PaaS) and/or the like. In such implementations, the computing device 201 may execute a local agent that may communicate over the network with the remotely executed verbal content router 210 and/or the verbal content handler(s) 222. The local agent may thus relay the captured verbal speech input(s) (e.g. the textual input and/or the speech input) the remotely executed verbal content router 210 and/or the speech processing module(s) 222 for processing.

Optionally, the verbal content router 210 and one or more of the verbal content handlers 212 are executed by an automated software agent platform, system and/or application, for example, a bot, an internet bot and/or the like which communicates over the network with one or more computing devices such as the computing device 201 used by the users 250 to receive the verbal input captured from the user(s) 250.

As shown at 102, the process 100 starts with the verbal content router 210 receiving a verbal input captured from the user 250 through the I/O interface 202. The verbal input may include textual content, speech content and/or the like and is captured accordingly through interfaces of the I/O interface 202 suited for each type of the verbal input. While verbal inputs in the form of the textual content are supported by the system 200 through execution of the process 100, verbal inputs in the form of the speech content may be of particular significance.

Optionally, the verbal content router 210 segments that verbal input to a plurality of segments each processed independently through the process 100.

As shown at 104, the verbal content router 210 may apply a plurality of verbal content identifiers to the received verbal input, for example, the content router 210 may provide the verbal input to the plurality of verbal content identifiers. Each of the verbal content identifiers is associated with a respective one of the verbal content handlers 212. As such each verbal content handler 212 may register its set (one or more) of associated verbal content identifiers at the verbal content router 210 to indicate the verbal content router 210 to apply the registered verbal content identifiers to the verbal input.

Since each of the verbal content handlers 212 is adapted to take action in response to one or more predefined verbal inputs, each verbal content identifier may be adapted to evaluate the association of the verbal input with its respective verbal content handler 212. The predefined verbal inputs may be identified and/or characterized by one or more predefined features, for example, content, intent (intention, purpose, objective, goal, etc.), entity (object, item, element, target device, target application, etc.), dialog flows and/or the like. Each verbal content identifier may therefore be adapted to identify, in the verbal input, features and evaluate their match with respective predefined features associated with its respective verbal content handler 212. As such each of the verbal content identifiers may be specifically and efficiently adapted, for example, designed, configured, trained and/or the like according to the specific characteristics of its respective verbal content handler 212. In particular, each of the verbal content identifiers may be specifically adapted, for example, designed, configured, trained and/or the like to focus on identifying the predefined features of its respective verbal content handler 212 in the verbal input. For example, one or more of the verbal content identifiers may employ one or more classifiers (classification functions) trained using training sample dataset(s) to identify certain predefined features associated with its respective verbal content handler 212.

Each verbal content identifier may extract one or more features from the verbal input using one or more verbal analysis tools, for example, a textual analysis, Natural Language Processing (NLP), speech recognition, Speech to Text (STT) conversion, speech synthesis, conversation construction and/or the like. The verbal content identifier may further employ such verbal analysis tools which are known in the art, for example, Watson Conversation Service (WCS), Watson Natural Language Understanding (NLU), regexp, API.AI, wit.ai and/or the like.

As shown at 106, for each feature it extracts from the verbal input, each of the verbal content identifier may compute a match confidence value for the extracted feature. The computed match confidence value may indicate the probability (match level) that the extracted feature actually matches its respective predefined feature defined (associated) for the respective verbal content handler 212. The match confidence value may typically be represented as a normalized value mapped to a range of [0, 1] where 0 is lowest probability and 1 is highest probability for the match. However, other implementations of the match confidence value may be used and the presented embodiment should not be construed as limiting. By computing the match confidence value for each of the extracted feature(s), the verbal content identifier may evaluate an association of the verbal input in general and the extracted features in particular with the verbal content handler 212 associated with the verbal content identifier.

For example, assuming a home appliance control verbal content handler 212 adapted to control operation of one or more home appliances, for example, a light, an air-conditioning system, a shutter and/or the like. Such home appliance control verbal content handler 212 may be associated with one or more predefined features, for example, light, air condition, shutter, turn-on, turn-off, open, close and/or the like. The predefined features may further include locations, for example, kitchen, living room, bed room and/or the like. The verbal content identifier(s) associated with the home appliance control verbal content handler 212 may therefore be adapted to extract one or more features from the verbal input and evaluate a match between the extracted feature(s) and the predefined features associated with the home appliance control verbal content handler 212 by computing the match confidence value for each extracted feature with respect to a respective one of the predefined features.

In another example, assuming a navigation control verbal content handler 212 adapted to control a navigation system for routing a vehicle, for example, a car, according to instructions received from the user 250. Such navigation verbal content handler 212 may be associated with one or more predefined features, for example, drive, travel, street, address, route and/or the like. The predefined features may further include geographical locations, for example, city name(s), street name(s), landmark name(s) and/or the like. The verbal content identifier(s) associated with the navigation verbal content handler 212 may therefore be adapted to extract one or more features from the verbal input and evaluate a match between the extracted feature(s) and the predefined features associated with the navigation verbal content handler 212 by computing the match confidence value for each extracted feature with respect to a respective one of the predefined features.

Optionally, one or more of the verbal content identifiers extract one or more context attributes relating to the verbal input, the user 250 and/or other the like. The verbal content identifier(s) may further compute the match confidence value for each extracted context attribute which may indicate a match probability to one or more predefined context attributes associated with the respective verbal content handler 212.

The context attributes may include, for example, an emotion and/or a sentiment of the user 250, for example, stress, anger, anxiety, joy, relaxation and/or the like. This may naturally be of major significance for verbal inputs in the form of speech input spoken (uttered) by the user 250. The verbal content identifier(s) may apply one or more analysis tools, for example, a voice analysis tool and/or the like to extract, i.e. evaluate and/or estimate one or more emotions and/or sentiments the user 250 may experience while uttering the verbal input. The verbal content identifier(s) may compute the match confidence value for each extracted emotion and/or sentiment which may indicate a match probability of the extracted emotion and/or sentiment with one or more emotions and/or sentiments that may be predefined for the respective verbal content handler 212 associated with the verbal content identifier. For example, an emergency oriented verbal content handler 212 adapted to initiate an emergency call to an emergency center may be associated with one or more predefined emotions and/or sentiments, for example, stress, anxiety and/or the like. The verbal content identifier(s) associated with the emergency oriented verbal content handler 212 may be adapted to extract the emotion(s) and/or sentiment(s) of the user 250 from the verbal input and compute the match confidence value for each extracted emotion and/or sentiment to evaluate the match of the extracted emotion and/or sentiment to a respective one of the predefined emotions and/or sentiments associated with the emergency oriented verbal content handler 212.

The context attributes may also include, for example, a geographical location of the user 250, for example, a specific geographical location, indoor, outdoor and/or the like. The verbal content identifier(s) may obtain such geographical location information from one or more location detection tools available in the computing device 201, for example, an Internet Protocol (IP) address, a navigation application (e.g. a Global Positioning System (GPS) based application), a triangulation system, a facility presence application (e.g. an application communicating with transmitters deployed in a facility, for example, a home, an office, a factory and/or the like to identify the current location), an calendar application which may indicate a location of an event currently taking place and/or the like. The verbal content identifier(s) may further obtain the geographical location from one or more sensors available in the computing device 201, for example, a light sensor which may indicate indoor and/or outdoor illumination, a GPS sensor and/or the like. The verbal content identifier(s) may compute the match confidence value for the geographical location which may indicate a match probability to one or more geographical locations that may be predefined for the respective verbal content handler 212 associated with the verbal content identifier. For example, the navigation verbal content handler 212 adapted to control the navigation system for routing the vehicle according to instructions received from the user 250 may be associated with outdoor geographical locations, in particular, a road, a highway and/or the like which may indicate (suggest) that the user 250 is currently driving the vehicle. The verbal content identifier(s) associated with the navigation verbal content handler 212 may therefore be adapted to compute a high match confidence value for outdoor geographical locations, in particular, the road, the highway and/or the like while computing a low match confidence value for indoor geographical locations.

In addition the context attributes may include one or more previous features, for example, intent, entity, a dialog flow and/or the like extracted from one or more previous verbal inputs. Moreover, one or more of the verbal content identifiers may compute the match confidence value for one or more of the previous features.

Optionally, one or more of the verbal content identifier evaluates presence of mandatory entity features in the verbal input which may be predefined for the respective verbal content handler 212 the verbal content identifier is associated with. The mandatory entities may be predefined to appear in verbal inputs that contain certain one or more intent features associated with the respective verbal content handler 212. The verbal content identifier(s) associated with such control verbal content hander(s) 212 may therefore be adapted identify the mandatory entity(s) in the verbal input and compute the match confidence value accordingly for the mandatory entity(s) associated with the control verbal content handler 212. For example, assuming the home appliance control verbal content handler 212 adapted to control operation of one or more home appliances, for example, the light, the air-conditioning system, the shutter and/or the like. One or more mandatory entities may be predefined for such home appliance control verbal content handler 212, for example, light, air condition, shutter and/or the like, in particular, the mandatory entity(s) may be predefined with respect to one or more intent features, for example, turn-on, open and/or the like. The verbal content identifier(s) associated with the home appliance control verbal content handler 212 may therefore be adapted identify the mandatory entity(s) in the verbal input and compute the match confidence value for the mandatory entity(s). For example, in case one of the associated verbal content identifier(s) identifies the turn-on intent feature with a certain match confidence value, the associated verbal content identifier(s) may further search for one or more predefined mandatory entities, for example, light, air-condition and/or the like and compute their match confidence value accordingly.

Optionally, one or more of the verbal content identifiers report and/or provide one or more operational attributes relating to their respective verbal content handler 212.

The operational attributes may include, for example, a capability (state) of their respective verbal content handler 212 to manage (handle) the verbal input. For example, assuming a certain verbal content identifier evaluates a certain feature extracted from the verbal input to match a certain predefined feature associated with the respective verbal content handler 212. However, assuming the certain predefined feature is typically not used during an initial interaction of the user 250 with the respective verbal content handler 212 but rather later on in the dialog flow. Further assuming the respective verbal content handler 212 was not yet initiated, i.e. previous verbal input(s) of the current session were not routed to the respective verbal content handler 212. In such case, the certain verbal content identifier may indicate that the respective verbal content handler 212 is incapable of managing the (current) verbal input since in is not in a state (not initialized) to manage the (current) verbal input. For example, assuming the certain verbal content identifier extracted a "yes" entity feature with a high match confidence value. However, the respective verbal content handler 212 which may typically be capable of managing the "yes" entity feature along one or more dialog flows is currently in un-initialized state in which the respective verbal content handler 212 is incapable of managing the "yes" entity feature.

The operational attributes may also include a description of the verbal analysis tool(s) used by one or more of the verbal content identifiers to extract the feature(s) from the verbal input. For example, a type/version of the NLP, a type/version of the speech recognition tool and/or the like.

The operational attributes may further include previous routing information relating to the respective verbal content handler 212. For example, a certain verbal content identifier may report a predefined number of previous routing events in which the respective verbal content handler 212 was selected to manage previous verbal input(s). The operational attributes may further include previous dialog flow(s) information for the respective verbal content handler 212. Each previous dialog flow may include and/or indicate one or more verbal inputs received by the respective verbal content handler 212 during the current session with the user 250.

One or more of the verbal content identifiers associated with respective verbal content handlers 212 may further report and/or provide one or more operational attributes relating to one or more other verbal content handlers 212. For example, a certain verbal content identifier associated with a certain verbal content handler 212 may obtain previous routing information relating to one or more other verbal content handlers 212. The certain verbal content identifier may obtain such routing information, for example, from one or more verbal content identifiers associated with the other verbal content handler(s) 212.

In some embodiments of the present invention, the verbal content router 210 may provide contextual information and/or operational information to one or more of the verbal content identifiers, in particular, the contextual information and/or operational information may be provided together with the respective verbal input. The verbal content router 210 may provide, for example, one or more context attributes and/or one or more operational attributes to one or more to the verbal content identifier(s). The context attributes and/or one or more operational attributes provided by the verbal content router 210 to a certain verbal content identifier may include attributes relating to the verbal content handler 212 associated with the certain verbal content identifier and/or to one or more other verbal content handlers 212. Moreover, one or more of the verbal content identifiers may compute the match confidence value for one or more context attributes and/or operational attributes received from the verbal content router 210. For example, the verbal content router 210 may provide the certain verbal content identifier with previous routing information and/or previous dialog flow(s) relating to the verbal content handler 212 associated with the certain verbal content identifier and/or to other verbal content handler(s) 212. Since the contextual information and/or operational information may be stored, managed and/or provided by the verbal content router 210, at least some of the verbal content handlers 212 may be independent from each other and/or possibly oblivious to each other while still able to take advantage of the contextual information and/or operational information relating to other verbal content handlers 212.

The verbal content identifiers may create a record, for example, a file, a structure, a list and/or the like comprising the computation results for the extracted features. The verbal content identifiers may optionally provide the computation results for the context attributes, for the mandatory entities. The verbal content identifiers may further provide the operational attributes. An exemplary such record is presented in pseudocode excerpt 1 below.

---

Pseudocode Excerpt 1:

---

```
{
    "Intents": {
        "Intent" {
            "intent-name":"turn-on"
            "confidence":0.9
        }
    }
    "Entities": {
        "entity":{
            "entity-name":"restaurant",
            "value":"McDonalds",
            "confidence":0.7
        }
    }
    "context" : {
        "current-location":"Haifa"
    }
    "emotions":{
        "emotion":{
            "emotion-name":"happy"
            "confidence":0.6
        }
    }
    "confidence-threshold":0.85,
    "Capable":true
}
```

---

As shown at 108, the verbal content router 210 collects the computation results provided by the plurality of verbal content identifiers for each feature extracted from the verbal input and selects a preferred one of the plurality of verbal content handlers 212 based on the computed match confidence values. For example, the verbal content router 210 may identify that a certain verbal content identifier computed a highest match confidence value for certain one or more extracted features and therefore select the verbal content handler 212 associated with the certain verbal content identifier to be the preferred verbal content handler 212. In another example, the verbal content router 210 may aggregate match confidence values computed for multiple features extracted by one or more of the verbal content identifiers and compute an aggregated match confidence value for the respective verbal content identifiers. The verbal content router 210 may select the preferred verbal content handler 212 to be the verbal content handler 212 associated with the verbal content identifier which presents the highest aggregated match confidence value.

Optionally, the verbal content router 210 collects the computation results provided by one or more of the verbal content identifiers for one or more of the context attributes and selects the preferred verbal content handler 212 using the match confidence value computed for the context attribute(s). In particular, the verbal content router 210 may aggregate the match confidence value of the context attribute(s) with the match confidence value computed by the same verbal content identifiers for the extracted features. This may significantly increase the accuracy of the selection of the preferred verbal content handler 212 since the context of the verbal input, the context of the user 250 and/or the like may be indicative of the actual intention(s) of the user 250.

For example, assuming a first verbal content identifier associated with a first verbal content handler 212 and a second verbal content identifier associated with a second verbal content handler 212 present similar match confidence values for one or more extracted features. The scope of the term similar may be predefined as a certain delta value such that in case the match confidence values computed by the multiple verbal content identifiers are within the predefined delta value, the match confidence values are considered similar. Further assuming the first verbal content handler 212 is associated with one or more certain emotions and/or sentiments, for example, stress and/or anxiety while the second verbal content handler 212 is associated with one or more other emotions and/or sentiments, for example, joy. In such case, the first and second verbal content identifiers may compute a significantly different match confidence value for the emotion and/or sentiment context attribute depending on the emotion and/or sentiment of the user 250 extracted from the verbal input. For example, assuming the user 250 currently experiences stress, the first verbal content identifier may compute a significantly high match confidence value for the emotion context attribute while the second verbal content identifier may compute a significantly low match confidence value for the emotion context attribute. In such case the verbal content router 210 may select the first verbal content handler 212 as the preferred verbal content handler 212.

In another example, assuming a first verbal content identifier associated with a first verbal content handler 212 and a second verbal content identifier associated with a second verbal content handler 212 present similar match confidence values for one or more extracted features. Further assuming the first verbal content handler 212 is associated with indoor context while the second verbal content handler 212 is associated with outdoor context. In such case, the first and second verbal content identifiers may compute a significantly different match confidence value for the geographical location context attribute depending on the geographical location of the user 250. For example, assuming the user 250 is currently outdoors, the first verbal content identifier may compute a significantly low match confidence value for the emotion context attribute while the second verbal content identifier may compute a significantly high match confidence value for the emotion context attribute. In such case the verbal content router 210 may select the second verbal content handler 212 as the preferred verbal content handler 212.

In another example, the verbal content router 210 may select the preferred verbal content handler 212 based on one or more of the previous features provided by one or more of the verbal content identifiers. For example, assuming a certain verbal content handler 212 was selected as the preferred verbal content handler 212 for one or more previous verbal inputs and/or part thereof, the verbal content router 210 may evaluate the previous routing optionally coupled with the computed match confidence value assigned to the previous feature(s) in order to select the preferred verbal content handler 212 to which the (current) verbal input is routed.

Optionally, the verbal content router 210 collects the operational attribute(s) provided by one or more of the verbal content identifiers and uses the operational attribute(s) to select the preferred verbal content handler 212. This may further increase the accuracy of the selection of the preferred verbal content handler 212 since the operational state of the verbal content hander(s) 212 may be indicative of previous interaction with the user 250. In some embodiments of the present invention, the verbal content router 210 globally stores one or more of the operational attributes. For example, the verbal content router 210 may store the previous (historical) routing information and/or dialog flow(s) reflecting routing of previous verbal inputs to the verbal content handler(s) 212, in particular during the current dialog session. Similarly to using the operational attribute(s) provided by the verbal content identifier(s), the verbal content router 210 may use the stored operational information for selecting the preferred verbal content handler 212 to which the (current) verbal input is routed. Storing, managing and/or providing the operational attributes to the verbal content identifiers may allow at least some of the verbal content handlers 212 to be independent from each other while still able to take advantage of the contextual information and/or operational information relating to other verbal content handlers 212.

For example, the verbal content router 210 may filter out, i.e. not select one or more verbal content handlers 212 which are associated with verbal content identifier(s) which produced match confidence value(s) which fail to exceed a certain threshold. The verbal content handler 212 may use a globally predefined threshold as the criterion for filtering out one or more of the verbal content handler 212. However, the verbal content handler 212 may use one or more predefined threshold provided by one or more of the verbal content identifiers as part of the operational attributes. In such case the value of the predefined threshold may be different for different verbal content identifiers. Optionally, the value of one or more predefined thresholds may be adapted for different extracted features, for different context attributes and/or for different mandatory entities.

In another example, the verbal content router 210 may filter out (not select) one or more verbal content handlers 212 indicated by their associated verbal content identifier(s) as incapable, i.e. not in state, to manage the verbal input.

In another example, the verbal content router 210 may filter out (not select) one or more verbal content handlers 212 for which their associated verbal content identifier(s) indicated that one or more mandatory entities are absent in the verbal input and/or the mandatory entity(s) are assigned a match confidence value failing to exceed the predefined threshold.

In another example, the verbal content router 210 may select the preferred verbal content handler 212 using the previous routing information and/or the previous dialog flow information provided by one or more of the verbal content identifiers. For example, assuming multiple verbal content identifiers present significantly similar match confidence value for the feature(s) extracted from the verbal input. In such case, the verbal content router 210 may select the preferred verbal content handler 212 to be the verbal content handler 212 which most recently managed a previous verbal input. For example, assuming a first verbal content identifier associated with a first verbal content handler 212 and a second verbal content identifier associated with a second verbal content handler 212 present similar match confidence values. Further assuming, a previous verbal input was routed to the second verbal content handler 212 more recently than a routing was made to the first verbal content handler 212. In such case, the verbal content router 210 may select the second verbal content handler 212 as the preferred verbal content handler 212 since, based on temporal locality, the probability that the current verbal input is directed to the second verbal content handler 212 may be higher than the probability that the current verbal input is directed to the first verbal content handler 212.

In another example, the verbal content router 210 may select the preferred verbal content handler 212 using the description of the verbal analysis tool(s) used by one or more of the verbal content identifiers to extract the feature(s) from the verbal input. For example, assuming multiple verbal content identifiers present significantly similar match confidence value for the feature(s) extracted from the verbal input. In such case, the verbal content router 210 may evaluate which verbal analysis tool(s) were applied by one or more of the verbal content identifiers and select, for example, the preferred verbal content handler 212 to be the verbal content handler 212 associated with the verbal content identifier that applied the most advanced verbal analysis tool(s).

Optionally, the verbal content router 210 uses a predefined and/or dynamically set prioritization mechanism which prioritizes the verbal content handlers 212. The priority may apply to individual verbal content handlers 212 and/or to groups of verbal content handlers 212. For example, assuming a first group of verbal content handlers 212 is assigned a high priority compared to a second group of verbal content handlers 212. The verbal content router 210 may give precedence to the first group when selecting the preferred verbal content handler 212. In such case the verbal content router 210 may select the preferred verbal content handler 212 from the first group even if a verbal content identifier associated with a verbal content handler 212 of the second group presents a higher match confidence match. However, in case none of the verbal content identifier associated with a verbal content handler 212 of the first group presents a match confidence match exceeding the threshold, the verbal content router 210 may select the preferred verbal content handler 212 from the second group.

Optionally, the verbal content router 210 selects a default verbal content handler 212 as the preferred verbal content handler 212. For example, the verbal content router 210 selects the default verbal content handler 212 in case none of the verbal content identifiers produces a match confidence value that exceeds the predefined threshold. This may apply to match confidence value computed for the extracted feature(s), for the context attribute(s) and/or for the mandatory entity(s). The verbal content router 210 may select, for example, browser type verbal content handler 212 as the preferred verbal content handler 212 and instruct the browser to access a certain website in which the user 250 may browse to accomplish his intention(s). The verbal content router 210 may optionally select the default verbal content handler 212 according to one or more of the context attributes. For example, assuming the verbal content handler 212 identifies, based on the context attributes provided by one or more of the verbal content identifiers, that the user 250 is located in a certain geographical location, for example, a movie theatre complex. In such case, the verbal content handler 212 may select, for example, parking finding verbal content handler 212 as the preferred verbal content handler 212 allowing the user 250 to seek guidance for locating a parking lot and/or a parking place.

As shown at 110, the verbal content router 210 routs the verbal input to the selected verbal content handler 212. Naturally, in case the verbal input was segmented, each of the segments is processed through the steps 104-110 of the process 100 and is routed to one the verbal content handlers 212 selected for the respective segment.

The selected verbal content handler 212 may initiate one or more actions, for example call a function, apply a feature, initiate an operation and/or the like as indicated by the user 250 through the verbal input. Naturally the actions initiated by the selected verbal content handler 212 are supported by the computing device 201. For example, assuming the computing device 201 is a Smartphone, the actions initiated by the selected verbal content handler 212 may include, for example, initiating a mobile application such as for example, initiate a phone call to a selected contact, send a text message and/or an email message to a selected contact, browse to a specific website, take a picture, start recording an audio input, play a media content, turn ON/OFF the computing device, set volume level and/or the like. In another example, assuming the computing device 201 is a control system of an autonomous vehicle, the actions initiated by the selected verbal content handler 212 may include, for example, starting/shutting the vehicle, setting a driving profile, turning lights ON/OFF, navigating to a certain geographical location, play a media content at an infotainment system of the vehicle and/or the like. In another example, assuming the computing device 201 is a control system for one or more home appliances, for example, a virtual personal assistant, the actions initiated by the selected verbal content handler 212 may include, for example, turning ON/OFF a home appliance, initiating an application at a home appliance, checking for status of a home appliance and/or the like.

It is expected that during the life of a patent maturing from this application many relevant systems, methods and computer programs will be developed and the scope of the term verbal analysis tool is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of routing a verbal input to one of a plurality of handlers, comprising:
using at least one processor adapted to execute a code, said code is adapted for:
receiving a verbal input from a user;
extracting at least one feature from said verbal input using at least one verbal analysis tool, said at least one feature comprises at least one of: an intent expressed by said user and an entity indicated by said user;
applying a plurality of verbal content identifiers to said verbal input, each of said plurality of verbal content identifiers is adapted to evaluate an association of said verbal input with a respective one of a plurality of handlers, by computing a match confidence value for said at least one feature extracted from said verbal input;
obtaining from at least one location detection tool a geographic location of said user; and
routing said verbal input to a selected one of said plurality of handlers based on said matching confidence value computed by said plurality of verbal content identifiers and according to said geographic location, said selected handler is adapted to initiate at least one action in response to said verbal input.

2. The computer implemented method of claim 1, wherein said geographic location is a member of a group consisting of: an indoor location, an outdoor location and a specifically predefined geographic location.

3. The computer implemented method of claim 1, wherein said at least one location detection tool is a member of a group consisting of: an Internet Protocol (IP) address, a navigation application, a triangulation system, a facility presence application, Global Positioning System (GPS) based application, a light detecting sensor and a calendar application.

4. The computer implemented method of claim 1, wherein at least one of said plurality of handlers is adapted to control a navigation system and is associated with at least one geographical feature selected from a group consisting of a road, a highway, a city name, a street name, an address and a landmark name.

5. The computer implemented method of claim 1, wherein said selected one of said plurality of handlers is adapted to operate a control system of an autonomous vehicle, and wherein said at least one action is at least one of: starting the vehicle, turning off the vehicle, setting a driving profile, turning lights on, turning lights off, navigating to a certain geographical location, and playing a media content at an infotainment system of the vehicle.

6. The computer implemented method of claim 1, wherein said at least one feature further comprises at least an indoor location and at least one home appliance related predefined feature, and wherein at least one verbal content identifier associated with at least one home appliance control verbal content handler is adapted to extract at least one feature from the verbal input and evaluate a match between the extracted at least one feature and the predefined feature associated with the at least one home appliance control verbal content handler by computing the match confidence value for each extracted feature with respect to a respective one of the predefined features.

7. The computer implemented method of claim 1, wherein said code is further adapted for selecting said selected handler according to a priority assigned to at least some of said plurality of verbal content identifiers.

8. The computer implemented method of claim 7, wherein said priority is assigned based on said geographic location of said user.

9. The computer implemented method of claim 1, wherein said verbal input comprises at least one member of a group consisting of: textual verbal input and speech verbal input.

10. The computer implemented method of claim 1, further comprising segmenting said verbal input to a plurality of segments and routing each of said plurality of segments to one of said plurality of handlers according to said match confidence value computed by said plurality of verbal content identifiers for said each segment and according to said geographic location.

11. The computer implemented method of claim 1, wherein each of said plurality of verbal content identifiers is associated with a respective one of said plurality of handlers by adapting said each verbal content identifier to evaluate said association according to at least one predefined feature defined for said respective handler.

12. The computer implemented method of claim 1, wherein said match confidence value indicates a probability of said at least one feature to match a respective predefined feature.

13. The computer implemented method of claim 1, wherein said intent is a member of a group consisting of: an intention, a purpose, an objective and a goal.

14. The computer implemented method of claim 1, wherein said code is further adapted for selecting said selected handler based on at least one context attribute provided by at least one of said plurality of verbal content identifiers, said at least one context attribute comprises at least one of:
an emotion of said user extracted using at least one voice analysis tool,
a sentiment of said user extracted using at least one voice analysis tool, and
at least one previous feature extracted from at least one previous verbal input.

15. The computer implemented method of claim 10, wherein said code is further adapted for selecting said selected handler based on detection of at least one mandatory entity extracted by at least one of said plurality of verbal content identifiers, said at least one mandatory entity is predefined to appear in said verbal input in conjunction with said intent.

16. The computer implemented method of claim 1, wherein said code is further adapted for selecting said selected handler based on at least one operational attribute provided by at least one of said plurality of verbal content identifiers, wherein said at least one operational attribute comprises at least one of:
a threshold value,
a capability of said respective handler to manage said verbal input,
a description of an analysis applied by at least one of said plurality of verbal content identifiers to extract said at least one feature,
a routing information relating to at least one previous verbal input, and
information obtained from at least another one of said plurality of handlers.

17. The computer implemented method of claim 1, wherein said code is further adapted for filtering out at least one of said plurality of handlers associated with one of said plurality of verbal content identifiers when at least one of the following conditions applies:

i. said confidence value fails to exceed a predefined threshold;

ii. said at least one of said plurality of handlers is incapable of managing said verbal input.

18. The computer implemented method of claim 1, wherein said code is further adapted for routing said verbal input to a specific handler, according to at least one of the following conditions:

i. routing to a recent handler of said plurality of handlers in case a similar said confidence value is computed by multiple verbal content identifiers of said plurality of verbal content identifiers, said recent handler is a most recent handler to which a previous verbal input was routed among a group of handlers associated with said multiple verbal content identifiers;

ii. routing to a default handler of said plurality of handlers in case said confidence value computed by said plurality of verbal content identifiers fails to exceed a predefined threshold.

19. A system for routing a verbal input to one of a plurality of handlers, comprising:

at least one processor adapted to execute code, the code comprising:

code instructions to receive a verbal input from a user;

code instructions to extract at least one feature from said verbal input using at least one verbal analysis tool, said at least one feature comprises at least one of: an intent expressed by said user and an entity indicated by said user;

code instructions to apply a plurality of verbal content identifiers to said verbal input, each of said plurality of verbal content identifiers is adapted to evaluate an association of said verbal input with a respective one of a plurality of handlers, by computing a match confidence value for said at least one feature extracted from said verbal input;

code instructions to obtain from at least one location detection tool a geographic location of said user; and code instructions to route said verbal input to a selected one of said plurality of handlers based on said matching confidence value computed by said plurality of verbal content identifiers and according to said geographic location, said selected handler is adapted to initiate at least one action in response to said verbal input.

20. A computer program product for routing a verbal input to one of a plurality of handlers, comprising:

a non-transitory computer readable storage medium;

first code instructions for receiving a verbal input from a user;

second code instructions for extracting at least one feature from said verbal input using at least one verbal analysis tool, said at least one feature comprises at least one of: an intent expressed by said user and an entity indicated by said user;

third code instructions for applying a plurality of verbal content identifiers to said verbal input, each of said plurality of verbal content identifiers is adapted to evaluate an association of said verbal input with a respective one of a plurality of handlers, by computing a match confidence value for at least one feature extracted from said verbal input;

fourth code instructions for obtaining from at least one location detection tool a geographic location of said user; and fifth code instructions for routing said verbal input to a selected one of said plurality of handlers based on said matching confidence value computed by said plurality of verbal content identifiers and according to said geographic location, said selected handler is adapted to initiate at least one action in response to said verbal input; wherein said first, second, third, fourth and fifth program instructions are executed by at least one processor from said non-transitory computer readable storage medium.

* * * * *